United States Patent [19]

Pinschmidt, Jr. et al.

[11] Patent Number: 5,155,167

[45] Date of Patent: Oct. 13, 1992

[54] VINYL ALCOHOL COPOLYMERS CONTAINING ALLYLAMINE FUNCTIONALITY

[75] Inventors: Robert K. Pinschmidt, Jr., Allentown, Pa.; Ta-Wang Lai, Novato, Calif.; Lawrence K. Wempe, Center Valley, Pa.

[73] Assignee: Air Products and Chemicals, Inc., Allentown, Pa.

[21] Appl. No.: 428,805

[22] Filed: Oct. 30, 1989

Related U.S. Application Data

[63] Continuation-in-part of Ser. No. 181,873, Apr. 15, 1988, abandoned, and a continuation-in-part of Ser. No. 181,887, Apr. 15, 1988.

[51] Int. Cl.⁵ .............................................. C08F 8/12
[52] U.S. Cl. ...................................... 525/60; 525/61; 525/62
[58] Field of Search ........................... 525/61, 60, 62

[56] References Cited

U.S. PATENT DOCUMENTS

| | | | |
|---|---|---|---|
| 2,748,103 | 5/1956 | Priest | 525/60 |
| 3,032,539 | 5/1962 | Schuller et al. | 260/85.5 |
| 4,393,174 | 7/1983 | Dawson et al. | 525/369 |
| 4,421,602 | 12/1983 | Brunnmueller et al. | 162/168.2 |
| 4,490,557 | 12/1984 | Dawson et al. | 564/159 |
| 4,713,236 | 12/1987 | Hoover et al. | 424/70 |
| 4,772,359 | 9/1988 | Linhart et al. | 162/163 |
| 4,774,285 | 9/1988 | Pfohl et al. | 525/60 |

OTHER PUBLICATIONS

W. M. Brouwer et al., "Copolymers of Vinylamine and Vinylalcohol by Acid Hydrolysis of Poly (N-Vinyl--Tert-Butylcarbamate-co-Vinylacetate): Evaluation of Reactivity Ratios," J. Poly. Sci. Polym. Chem. ed., vol. 22, pp. 2353-2362 (1984).

R. W. Stockman, et al., "Synthesis of N-Vinylacetamide and Preparation of Some Polymer and Copolymers", Ind. Chem. Prod. Res. Dev., 24, 242-246 (1985).

*Primary Examiner*—Joseph L. Schofer
*Assistant Examiner*—Jeffrey T. Smith
*Attorney, Agent, or Firm*—Russell L. Brewer; James C. Simmons; William F. Marsh

[57] ABSTRACT

A modified poly(vinyl alcohol) copolymer is provided containing copolymerized units of allylamine and/or diallylamine by copolymerizing a vinyl ester, such as vinyl acetate, and an N-allylamide and/or N,N-diallylamide, such as N-allylformamide and/or N,N-diallylformamide and hydrolyzing first the ester groups to hydroxy groups and then the amide groups to amine groups. The second hydrolysis is carried out on solvent-swollen particulate polymer slurried in an acidic or basic medium. The modified polymer can contain small amounts of unhydrolyzed ester and amide groups in addition to the hydroxy and amine functionality which characterizes the copolymer.

16 Claims, No Drawings

VINYL ALCOHOL COPOLYMERS CONTAINING ALLYLAMINE FUNCTIONALITY

CROSS REFERENCE TO RELATED APPLICATIONS

This application is a continuation-in-part of application Ser. No. 181,873 now abandoned and Ser. No. 181,887, both filed Apr. 15, 1988.

FIELD OF THE INVENTION

This invention relates to copolymers of vinyl alcohol containing allylamine functionality. In another aspect it relates to a method of making such copolymers using a two-step hydrolysis.

BACKGROUND OF THE INVENTION

Amine-containing polymers are highly useful materials and represent a very cost effective way of incorporating cationic charge into polymers for uses such as cationic electrocoating, water treatment and enhanced oil recovery. Primary and, to a lesser extent, secondary amines offer the highest general reactivity spectrum of any group compatible with water. They will react with anhydrides, epoxides, isocyanates, esters, aziridines, aldehydes, ketones, Michael acceptors, aminoplasts and other alkylating agents to form covalent linkages. They react with acids and metal ions to form ionic linkages. Simple derivatives, e.g., Schiff bases, strongly and selectively complex many metal ions. This high reactivity enables many uses in areas such as coatings, adhesives, binders, structural polymers, viscosity control agents, ion exchange resins, and polymer boundary agents for bio-medical applications.

Because of their high electron donating ability when unprotonated and cationic charge when protonated, amine functional polymers offer superior adhesion to many types of substrates compared to other polymers which are typically neutral or anionic. The ability to change the reactivity and properties of primary or secondary amines by a simple pH change (addition of acid or base) offers numerous valuable options for viscosity control, emulsion stability control, polymer solubility modification (especially in water), or for formulating shelf-stable but reactive crosslinking or substrate reactive systems.

Synthesis of amine functional addition polymers in general is difficult for two reasons. The simplest amine functional monomer, vinyl amine, is thermodynamically and kinetically unstable relative to the isomeric Schiff base and condensation products of the base, ethylidene imine. Also, more stable allyl- and diallyl/amine monomers are expensive and typically show severe chain transfer during radical polymerization, especially involving allyl protons on carbon atoms alpha to the nitrogen. The allylamines are known to produce mainly low molecular weight polymers and copolymers, even using large amounts of free radical initiators.

For many purposes it is desirable to prepare water soluble polymers which contain relatively low levels of amine functionality, either to reduce costs by diluting the expensive amine component or for applications in which a lower level of cationic or reactive amine gives superior performance. A particularly attractive polymer for certain applications would be a vinyl alcohol copolymer with a low but controllable level of amine functionality.

Preparation of amine functional polyvinyl alcohol (PVOH) has been previously attempted by hydrolyzing copolymers of vinyl acetate and either N-vinyl-O-t-butyl carbamate or N-vinylacetamide. The carbamate monomer is prepared by a long and costly synthesis and is reported to hydrolyze to a highly toxic aziridine in the presence of water. In both cases the poly(vinyl acetate) component was hydrolyzed with methanolic or aqueous base. In the carbamate case, treatment of an aqueous solution of the poly(vinyl alcohol)-co-poly(N-vinyl-O-t-butyl carbamate) with acid gave the poly(vinyl alcohol)-co-poly(vinylamine) acid salt. Hydrolysis of the poly(N-vinylacetamide) is known to require strong acid at high temperatures. Both approaches produce a relatively dilute aqueous solution of the polymer which is expensive to store or ship or requires expensive additional steps to isolate the polymer from the solution. The aqueous solution also contains substantial amounts of frequently undesirable salts or acid.

It has been known for over 30 years that copolymers of vinyl alcohol containing a small amount of allylamine functionality could be prepared by copolymerization followed by hydrolysis. In U.S. Pat. No. 2,748,103, Priest (1956), reference is made to a hypothetical copolymer of vinyl alcohol and allylamine. This reference describes a method of making such copolymers containing 0.1 to 5.0% by weight of allylamines with the balance of the polymer being vinyl alcohol. The preparation is accomplished by copolymerizing a vinyl ester, for example vinyl acetate, and N-allylurethane followed by hydrolysis in two steps, first to convert the acetate groups to hydroxide groups, and secondly to convert the urethane groups to amine groups. The second step is carried out using 1 to 3% aqueous sodium hydroxide in the solution at 40°–100° C.

U.S. Pat. No. 3,032,539, Schuller, et al., (1962) discloses copolymerizating diallylamines and copolymerizable monomers containing ethylenic unsaturation such as styrene, vinyl acetate, acrylonitrile, acrylamide, methyl acrylates, and the like. The reference suggests 0.1 to 40 mole % diallylamine and 60 to 99.9% comonomer. It is stated that the procedure used yields linear polymers instead of a crosslinked polymer but the reason for this is not fully understood. There is no disclosure of converting such polymers by hydrolysis to copolymers of vinyl alcohol.

U.S. Pat. No. 4,393,174, Dawson, et al., (1983) discloses the base hydrolysis of polymers having pendant amide units, for example, N-vinylacetamide. The amide functionalities are converted with the polymers in solution to amine functionality using a strong aqueous base at elevated temperature.

U.S. Pat. No. 4,421,602, Brunnmueller, et al, (1983) describes polymerizing N-vinylformamide and hydrolysis of the formamide group in the presence of acid or base at 20° to 200° C. to form a polymer having 10 to 90% pendent amino groups and 90 to 10% pendent formyl groups. It is stated that such polymers are useful in paper making.

U.S. Pat. No. 4,490,557, Dawson, et al., (1984) discloses preparing ethylidene bisformamide, which is then pyrolyzed to N-vinylformamide which is then polymerized and the polymer is acid hydrolyzed to poly(vinylamines).

W. M. Brouwer, et al.; J. Polym. Sci. Polym. Chem. Ed., Vol. 22, pp. 2253-2362 (1984) describes the previously mentioned hydrolysis of a copolymer of poly(N-vinyl-O-t-butyl carbamate-co-vinyl acetate) to poly(- vinylamines-co-vinyl alcohol). The author points out that the vinyl carbamate produces on aqueous hydrolysis a toxic product of ethylenimine.

R. W. Stackman, et. al.; Ind. Eng. Chem. Prod. Res. Dev., 24, 242-246 (1985) describes copolymerization of N-vinylacetamide (NVA) with vinyl acetate (VAc) as well as homopolymerization of the N-vinylacetamide. Hydrolysis of the acetamide polymer produces poly(vinylamine). It is stated that hydrolysis of the copolymer involves only the acetate groups initially, and hydrolysis of 20:80 NVA:VAc copolymer with base proceeded to 70% completion. Hydrolyzed copolymers are said to have formed clear films that were tougher than the homopolymer of N-vinylacetamide or the unhydrolyzed copolymer.

U.S. Pat. No. 4,713,236, Hoover, et al., (1987) describes preparation of a hair conditioning product containing a polymer with pendent amine or amine salt groups. This polymer can be prepared by hydrolysis of poly(N-vinylformamide) or poly(N-vinylacetamide). A copolymer of N-vinylacetamide with vinyl acetate can be formed which on hydrolysis produces a copolymer containing pendent hydroxyl and amino groups. Partial hydrolysis is said to be a way of modifying the polymer.

U.S. Pat. No. 4,772,359, Linhart, et al., (1988) describes a paper making process using as drainage aids and flocculants high molecular weight polymers of N-vinylamides, for example N-vinylformamide, including copolymers such as N-vinylformamide with vinyl acetate. These polymers are, however, not hydrolyzed.

U.S. Pat. No. 4,774,285, Pfohl, et al., (1988) describes copolymerization of N-vinylformamide (95-10%) and ethylenically unsaturated monomer (5-90 mole %), such as vinyl acetate or vinyl propionate and hydrolyzing 30 to 100% of the monomer units using hydrochloric acid or sodium hydroxide solution at 20° to 100° C. When NaOH solution is used at 50° C., both the N-vinylformamide and the vinyl acetate groups are hydrolyzed to about equal extent. The polymers are useful in paper making.

SUMMARY OF THE INVENTION

According to our invention a process is provided for synthesizing poly(vinyl alcohol)-co-poly(allylamine) [PVOH/PAAm]. This process enables the efficient hydrolysis of vinyl ester/N-allyl- or N,N-diallylamide copolymer particles in a two phase system yielding PVOH/PPAm particles which can be readily isolated by filtration.

According to our process a copolymer of poly(vinyl alcohol) containing copolymerized units of N-allylamide and/or N,N-diallylamide is hydrolyzed by suspending particles of the copolymer in methanol and converting the amide-containing copolymer to the amine functionality under acidic or basic conditions.

Our invention also provides a copolymer of vinyl alcohol containing amine functionality and having the general structural formula of randomly interpolymerized monomer units in the indicated molar proportions:

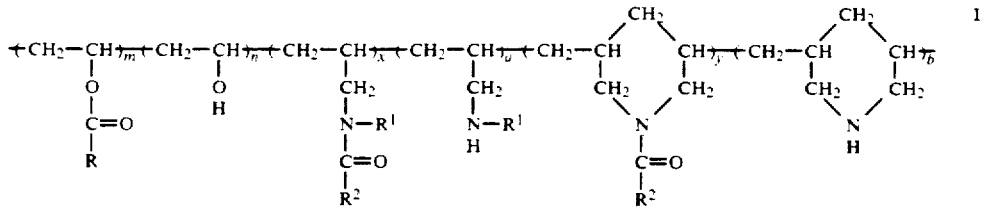

wherein

R is H, alkyl containing 1 to 11 to carbons, phenyl, or trifluoromethyl;

R$^1$ is H, alkyl containing 1 to 4 carbons, or 2-hydroxyalkyl containing 1 to 4 carbons;

each R$^2$ is H, methyl or trifluoromethyl;

m, n, x, y, a and b are integers which added together make a sum;

m is 0 to 15 percent of said sum;

n is 50 to 99 percent of said sum;

x plus y are 0 to 30 percent of said sum; and a or b can be zero but the total of a and b is 1 to 50 percent of said sum except b is greater than zero when a is less than 5 percent of said sum.

DETAILED DESCRIPTION OF THE INVENTION

The present invention provides an industrially attractive process for synthesizing a poly(vinyl alcohol) copolymer containing copolymerized units of allylamine and/or diallylamine by two-phase hydrolysis of solvent-swollen particles of the vinyl alcohol copolymer containing copolymerized units of N-allylamide or N,N-diallylamide. The amide-containing copolymer is prepared by copolymerizing vinyl acetate with either or both of N-allylamide, such as N-allylformamide (NAF) and N,N-diallylamide, such as N,N-diallylformamide (NDF). The polymer is formed as a solution in an alcohol and the amide and acetate containing polymer is then hydrolyzed to convert the acetate functionality, at least in part, to hydroxyl groups in a methanolic medium thereby forming a poly(vinyl alcohol) copolymer (PVOH) containing the copolymerized units of the N-allylformamide and/or N,N-diallylformamide as a particulate gel swollen with methanol. This particulate gel is then hydrolyzed while in a slurry in methanol to form the amine-containing copolymer of poly(vinyl alcohol). These amine units are copolymerized allylamine (PAAm) or diallylamine (PDAm).

Acid hydrolysis provides a cationic product while base hydrolysis yields a salt free, amine functional vinyl alcohol copolymer. The process provides efficient hydrolysis of the vinyl alcohol-N-allylformamide (or vinyl alcohol N,N-diallylformamide) copolymer particle in a two-phase system yielding PVOH/PAAm (or PVOH/PDAm) particles which can be readily isolated by filtration. Since it is not necessary to dissolve the PVOH/PNAF (or PVOH/PNDF) in order to perform the hydrolysis of the amide functionality of the copolymer, it is not necessary to precipitate the hydrolyzed product again.

For purposes of describing the invention, a copolymer of formula I will be discussed, namely poly(vinyl alcohol)-co-poly(allylamine) and referred to as PVOH/PAAm. Nevertheless, it is to be understood that PVOH/PAAm can contain some unhydrolyzed vinyl alcohol units as the acetate ester; i.e., vinyl acetate units. Preferably such unhydrolyzed ester units are not over 2 mol over 2 mol percent of the polymer. Contemplated as the functional equivalent of vinyl acetate for the purposes of this invention are vinyl esters of formic acid, other $C_3$-$C_{12}$ alkanoic acids, benzoic acid and trifluoroacetic acid. In addition, PVOH/PAAm can also contain some allylamine or diallylamine units as the unhydrolyzed allylamide, i.e., N-allylformamide units. Preferably such unhydrolyzed amide units are not over 4 mol percent, for example 0.5 to 4 mol percent, of the polymer. Contemplated as the functional equivalent of N-allylformamide and N,N-diallylformamide for purposes of this invention are allylamides and diallylamides such as N-allylacetamide, N,N-diallylacetamide, N-allyltrifluoroacetamide and those amides in which the nitrogen is substituted with a $C_1$-$C_4$ alkyl or 2-hydroxyalkyl group.

The copolymers of the invention have an average molecular weight ($\overline{M}w$) ranging from about 1,000 to 200,000, preferably 5,000 to 130,000.

The process of the invention is described with reference to the preferred monomers, vinyl acetate and N-allylformamide or N,N-diallylformamide. The abbreviation "PNAF" is meant to indicate the copolymerized units of N,N-diallylformamide as well as those of N-allylformamide. The copolymers can be prepared by a free radical continuous or batch polymerization process. The continuous process gives more uniform molecular weight distribution and uniformity of comonomer incorporation (i.e., a substantially random homogeneous copolymer), improves the lot-to-lot uniformity and offers the commercial attractiveness of continuous operation. The batch process allows production in simple batch equipment and can be carried to high conversion to avoid monomer stripping.

Suitable free radical initiators for the polymerization reaction include organic peroxides such as t-butyl peroxypivalate, di(2-ethyl-hexyl)peroxydicarbonate, t-butyl peroxyneodecanoate and 2,2'-azobisisobutyronitrile. The concentration of the initiator in the polymerization reaction mixture normally ranges from 0.0001-2 wt %, the preferred concentration being 0.001-0.5 wt %.

Preferably the polymers are prepared using a train of continuous stirred tank reactors followed by a hydrolysis, or alcoholysis, reaction. Vinyl acetate, N-allyl- or N,N-diallylformamide, free radical initiator and methanol are added continuously to the first reactor. The N-allyl- or N,N-diallylformamide comonomer can be added to subsequent reactors in order to maintain a homogeneous copolymer.

Unreacted vinyl acetate is removed from the exit stream by contacting it with methanol vapors in a stripping column yielding an intermediate vinyl acetate random copolymer [PVAc/PNAF] having one of the general formulas II.

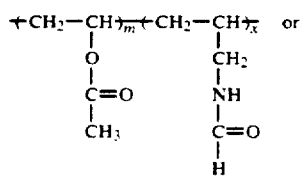

II.

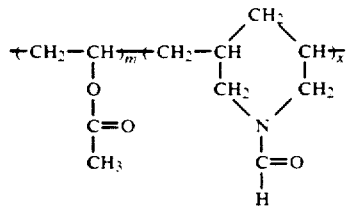

wherein m = 50-99 mole %, preferably 80 to 97 mole %, and
x = 1-50 mole %, preferably 3 to 20 mole %, of the sum of m+x.

Although a six-membered ring is shown in the structural formulas deriving from the diallyl monomer, the five-membered ring isomer

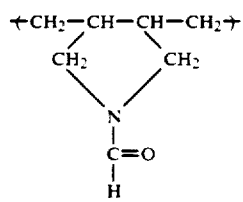

is the functional equivalent in these polymers.

The alcoholysis of the intermediate PVAc/PNAF copolymer is effected by the addition of a base catalyst. The resulting solid PVOH/PNAF gel swollen by methanol and methyl acetate is ground to give a granular product and rinsed with fresh methanol to remove methyl acetate. The PVOH/PNAF has the following general formula III.

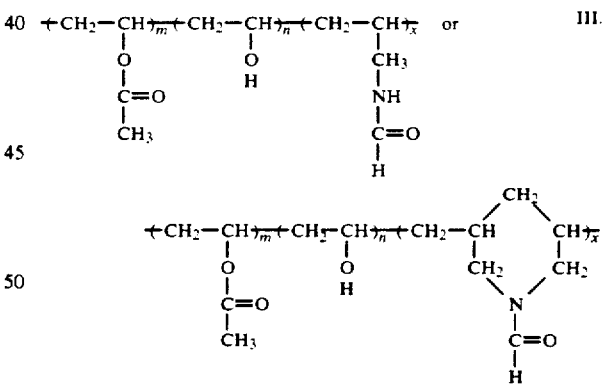

III.

where m is 0-15 mole %, preferably 0-2 mole % for subsequent base hydrolysis to the vinylamine copolymer, n is 50-99 mole %, preferably 80 to 97 mole %, and
x is 1 to 50 mole %, preferably 3 to 20 mole % of the sum m+n+x.

Since the copolymer can also be made with both N-allylamide and N,N-diallylamide, the structural formula can also be written to illustrate randomly copolymerized monomer units in the indicated molar proportions, as follows:

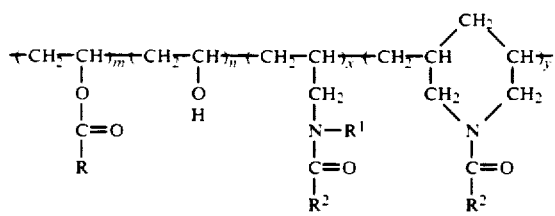

wherein

R is H, alkyl containing 1 to 11 carbons, phenyl, or trifluoromethyl;

R[1] is H, alkyl containing 1 to 4 carbons, or 2-hydroxyalkyl containing 1 to 4 carbons, each R[2] is H, methyl or trifluoromethyl;

m, n, x and y are each positive integers which added together make a sum;

m is 0 to 15 percent of said sum;

n is 50 to 99 percent of said sum; and x or y can be zero but the total of x+y is 1 to 50 percent of said sum.

A suitable process for preparing the PVAc/PNAF and subsequent hydrolysis to PVOH/PNAF is essentially like the process described in U.S. Pat. No. 4,675,360 directed to vinyl alcohol/poly(alkyleneoxy) acrylate copolymers, the disclosure of which is incorporated herein by reference.

Stripping of unreacted vinyl acetate is most conveniently done for continuous processes by countercurrent contacting of the polymer paste solution with hot solvent. Stripping can be avoided by fully converting the monomers as in many batch processes. Hydrolysis without prior removal or reduction of vinyl monomer by polymerization or other chemical reaction tends to produce unacceptable levels of acetaldehyde and its condensation products. These in turn produce color and may crosslink PVOH or PAAm groups, reducing polymer solubility. N-allylformamide or other allyl and diallyl amides are more difficult to remove from the solution polymer, but their higher reactivity than vinyl acetate in the polymerization and frequently lower levels of incorporation minimize the amounts of these monomers present in the final product. Also, unlike the vinylamides, the allylamides do not impart acetaldehyde or its condensation products to the final polymer, even if residual levels of unpolymerized monomer are present.

The copolymers of the invention can also contain other comonomers, such as for example, (meth)acrylate, crotonate, fumarate or maleate esters, vinyl chloride, ethylene, N-vinylpyrrolidone, acrylamide, vinylsulfonate salts and styrene in amounts ranging up to about 20 mole %.

The hydrolysis of the PVAc/PNAF can be conducted batch or continuously with acid or base catalysis in various solvents. It is most conveniently done, however, in methanol, optionally with various levels of water, via base catalyzed transesterification. The reaction gives methyl acetate as a volatile coproduct and PVOH copolymer as a solvent-swollen but insoluble separate phase. The level of PVAc hydrolysis is adjusted by varying the base addition level and reaction time, but becomes essentially complete during base initiated PNAF hydrolysis in the subsequent step.

The transesterification solvent (for example, methanol) level can be varied over wide ranges which should exceed the amount required by reaction stoichiometry and preferably provide sufficiently low viscosity for efficient mixing of added catalyst and for heat removal. Desirably, a powdery product is obtained directly in a batch hydrolysis using a vessel with efficient stirring by adding large amounts of methanol, for example a 10-fold excess over PVAc copolymer, but high levels of methanol give lower polymer throughput or require larger equipment. Continuous hydrolysis of copolymer with base can be conveniently practiced at 20-60% polymer solids by mixing the base catalyst with the alcohol solution of the copolymer and extruding the mixture onto a moving belt, much as is done commercially for the preparation of PVOH homopolymer. The hydrolyzed polymer in the form of a methanol/methyl acetate swollen gel is then ground and can be rinsed with fresh methanol to remove catalyst residues and methyl acetate. The resulting methanol-swollen polymer can then be dried or, preferably, used as is in the subsequent PNAF hydrolysis step.

The hydrolysis of PVOH/PNAF to PVOH/PAAm (or PVOH/PNDF to PVOH/PDAm) can be accomplished by base or acid hydrolysis. Base hydrolysis, preferably with alkali hydroxide (NaOH or KOH) or alkaline earth hydroxide, requires 0.7 to 3 times, preferably 1 to 1.5 times, stoichiometric quantities based on PNAF or PNDF, and is best conducted at elevated temperatures (50°-80° C.). Although the base or acid hydrolysis reaction can be accomplished in aqueous solution, the product must then be recovered by precipitation or solvent evaporation. As a slurry of methanol-swollen PVOH/PNAF particles in methanol, the two phase reaction is initially fast, but slows down after partial conversion, probably reflecting slow reaction with less accessible formamide groups. Conversion after 24 hours is about 85% but can be raised to 93% by adding small amounts of water in amounts up to 20 wt %, preferably 1 to 10 wt %, based on methanol. The slurry can comprise 10 to 65 wt %, preferably 20 to 50 wt %, copolymer particles in methanol. Contemplated as the functional equivalent of methanol as the liquid medium of the slurry are $C_2$-$C_6$ alkyl alcohols and diols and $C_4$-$C_8$ alkyl ethers. The methanol can also contain methyl acetate from the hydrolysis of the PVAc component. The two phase hydrolysis has the advantage that the products can be separated from the liquid phase, rinsed, and dried to produce a salt-free primary amine functional PVOH in a commercially practicable process.

The base hydrolysis reaction is best run on substantially fully hydrolyzed ($\geq$98 mole %) PVOH copolymer.

Acid hydrolysis gives rapid and complete PNAF or PNDF hydrolysis in the copolymer when conducted at temperatures ranging from 15° to 80° C. Suitable strong acids would include the halogen acids, nitric acid, trifluoroacetic acid and methane sulfonic acid, with hydrochloric acid being preferred. Di-and higher valent acids such as sulfuric acid or phosphoric acid are also suitable. Acid in 0.7 to 3 times, preferably 1 to 1.5 times stoichiometry based on PNAF or PNDF is required for this hydrolysis reaction with levels near stoichiometric preferred for avoiding post-neutralization of the excess acid. Although acid hydrolysis in aqueous solution is feasible, the reaction is preferably performed as a methanol suspension of PVOH/PNAF or PVOH/PNDF particles. Full hydrolysis of the acetate linkages and prior removal of methyl acetate are not required with the two phase acid hydrolysis.

Acid hydrolysis is the preferred route to PVOH/-PAAm.HX, i.e., where the charged ammonium salt product is acceptable or desired.

Thus, N-allylformamide and N,N-diallylformamide are used as amine precursors which copolymerize efficiently with structurally similar vinyl acetate under essentially industry-standard conditions and hydrolyze efficiently under acid or base treatment in a methanol slurry to generate thermally stable reactive primary amines or ammonium salt groups along the polymer chain. Protection of the amine, as the readily hydrolyzed formyl derivative in particular, allows surprisingly mild conditions in the final step.

The base hydrolysis step proceeds via essentially full hydrolysis of the PVAc component of the copolymer. The coproduced methyl acetate is optionally removed by rinsing the particulate, solvent-swollen polymer with fresh solvent, and then hydrolysis of the still solvent-swollen PVOH/PNAF or PVOH/PNDF particles is rapidly effected by alcohol soluble base. The use of a two phase system, i.e., use of a solvent in which the PVOH/PNAF and PVOH/PAAm are no longer soluble, allows the unreacted base and salt products to be removed by decantation, centrifugation, or filtration, and washing, with the copolymer readily recovered in a granular solid form.

Alternatively, acid catalyzed hydrolysis of the ground, solvent-swollen polymer depends on protonation of the relatively basic formamide nitrogen to give a good leaving group which can be readily displaced by water or alcohol to give a formate ester or formic acid as products. Unreacted excess acid, salts and by-product formic acid can be removed by decantation or filtration and washing to give a granular solid product.

The invention can be further understood by reference to the following examples which are presented for illustration of specific embodiments only and should not be construed to limit the invention unduly.

EXAMPLE I

Preparation of N-allylformamide

Methyl-t-butyl ether (MTBE) (200 g) and 1.2 moles of ethyl formate were combined in a 100 mL 3-neck flask equipped with mechanical stirrer, thermometer, water condenser, 100 mL addition funnel and $N_2$ blanket. N-allylamine (1.0 mole) was weighed into the addition funnel and added over 30 minutes. The reaction was stirred vigorously for 1.5 hours with no increase in temperature. A magnetic stirrer replaced the mechanical stirrer and the reaction mix was left over the weekend. MTBE and ethanol were removed using a rotary evaporator. The reduced solution was vacuum distilled. Approximately 25 mL of ethanol distilled off first. N-allylformamide (NAF) distilled at 134° C./51 torr, which is in approximate agreement with the literature: Saegusa, et al., Bulletin of Chemical Society of Japan, Vol. 42, pg. 2610-2614 (1969) reports 120°-122° C./48 torr. The 79 g collected gave a yield of 93%. Gas chromatographic analysis showed 99+% purity. Structure was confirmed by NMR.

EXAMPLE II

Preparation of N,N-diallylformamide

Ethyl formate (55.6 g, 750 mmole) and 37.5 g (385 mmole) of N,N-diallyl amine were combined in a 250 mL 3-neck flask equipped with mechanical stirrer, Friedrich condenser, and $N_2$ blanket. The reaction mixture was stirred at reflux temperature (120° C. oil bath) for 24 hours and then sampled by GC to determine if all the N,N-diallylamine was reacted, RT of 0.4 mm. The product was vacuum distilled using a 1-piece apparatus with a fractionation column. The first fraction distilled at 30° C./16 torr. The second fraction N,N-diallylformamide (NDF), distilled at 88°-90° C./10-14 torr. The yield was 95%. Structure was confirmed by NMR.

EXAMPLE III

Preparation of poly(vinyl acetate)/6% poly(N,N-diallyl formamide) at 45% monomer concentration (PVAc/6% PNDF)

To a 1 L resin kettle equipped with condenser, $N_2$-inlet, thermometer, thermowatch, mechanical stirrer, and heating mantle were added vinyl acetate (125.5 g), N,N-diallylformamide (11.65 g), methanol (167 g), tartaric acid (0.05 g) and Trigonox (t-butylperoxyneodecanoate, Nauri) (0.11 g). The resulting solution was purged with $N_2$ for 1 hour, and then heated to 60° C. While maintaining the reaction temperature at 60° C., 0.66 g Trigonox (in 30 g MeOH, 0.05 g tartaric acid) was added into the reaction mixture over 6 hours. After an additional 18 hours, the resulting polymer solution was cooled to room temperature and was directly usable for the subsequent hydrolysis (VAc conversion=39%).

Hydrolysis of PVAc/6% PNDF to PVOH/6% PNDF

PVAc/6% PNDF polymer paste as prepared above was diluted with methanol to give a 10% solution. Unreacted vinyl acetate monomers in the polymer paste were then distilled off. The resulting solution was heated to 65° C., and KOH (0.02 eq. on VAc) in 10 g of methanol was then added into the polymer solution over 1 hour. The polymer precipitated as a white powder near the end of catalyst addition. After stirring for one more hour at 65° C., the polymer slurry was cooled and filtered.

Hydrolysis of PVOH/6% PNDF to PVOH/6% PDAm

The wet polymer powder was washed with methanol twice and then transferred to a 3-neck round bottomed flask equipped with condenser, $N_2$-inlet, thermometer, thermowatch, mechanical stirrer, and heating mantle. Methanol (160 g) and aqueous hydrochloric acid (3 eq. on DAF) were added. The resulting polymer suspension was heated to reflux for 12 hours. The final polymer was filtered, washed, and dried (yield=71%).

EXAMPLE IV

Preparation of poly(vinyl acetate)/6% poly(N,N-diallylformamide) at 65% monomer concentration (PVAc/6% PNDF)

To a 1 L resin kettle equipped with condenser, $N_2$-inlet, thermometer, thermowatch, mechanical stirrer, and heating mantle were added vinyl acetate (125.5 g), N,N-diallylformamide (11.65 g), methanol (74.4 g), tartaric acid (0.05 g) and Trigonox (0.11 g). The resulting solution was purged with $N_2$ for 1 hour, and then heated to 60° C. While maintaining the reaction temperature at 60° C., 0.66 g Trigonox (in 30 g MeOH, 0.05 g tartaric acid) was added into the reation mixture over 6 hours. After an additional 18 hours, the resulting polymer solution was cooled to room temperature and was directly usable for the subsequent hydrolysis (VAc conversion = 75%).

Hydrolysis of PVAc/6% PNDF to PVOH/6% PNDF

PVAc/6% PNDF polymer paste as prepared above was diluted with methanol to give a 10% solution. Unreacted vinyl acetate monomers in the polymer paste were then distilled off. The resulting solution was heated to 65° C., and KOH (0.02 eq. on VAc) in 10 g of methanol was then added into the polymer solution over 1 hour. The polymer precipitated as a white powder near the end of catalyst addition. After stirring for one more hour at 65° C., the polymer slurry was cooled and filtered.

Hydrolysis of PVOH/6% PNDF to PVOH/6% PDAm

The wet polymer powder was washed with methanol twice and then transferred to a 3-neck round bottomed flask equipped with condenser, $N_2$-inlet, thermometer, thermowatch, mechanical stirrer, and heating mantle. Methanol (160 g) and aqueous hydrochloric acid (3 eq. on DAF) were added. The resulting polymer suspension was heated to reflux for 12 hours. The final polymer was filtered, washed, and dried (yield = 77%).

EXAMPLE V

Preparation of poly(vinyl acetate)/12% poly(N,N-diallyl formamide) at 65% monomer concentration (PVAc/12% PNDF)

To a 1 L resin kettle equipped with condenser, $N_2$-inlet, thermometer, thermowatch, mechanical stirrer, and heating mantle were added vinyl acetate (117.3 g), N,N-diallylformamide (23.3 g), methanol (75.7 g), tartaric acid (0.05 g) and Trigonox (0.11 g). The resulting solution was purged with $N_2$ for 1 hour, and then heated to 60° C. While maintaining the reaction temperature at 60° C., 0.66 g Trigonox (in 30 g MeOH, 0.05 g tartaric acid) was added into the reaction mixture over 6 hours. After an additional 18 hours, the resulting polymer solution was cooled to room temperature and was directly usable for the subsequent hydrolysis (VAc conversion = 59%).

Hydrolysis to PVOH/12% PNDF

PVAc/12% PNDF polymer paste as prepared above was diluted with methanol to give a 10% solution. Unreacted vinyl acetate monomer in the polymer paste was then distilled off. The resulting solution was heated to 65° C., and KOH (0.02 eq. on VAc) in 10 g of methanol was then added into the polymer solution over 1 hour. The polymer precipitated as a white powder near the end of catalyst addition. After stirring for one more hour at 65° C., the polymer slurry was cooled and filtered.

Hydrolysis to PVOH/12% PDAm

The wet polymer powder was washed with methanol twice and then transferred to a 3-neck round bottomed flask equipped with condenser, $N_2$-inlet, thermometer, thermowatch, mechanical stirrer, and heating mantle. Methanol (160 g) and aqueous hydrochloric acid (3 eq. on DAF) were added. The resulting polymer suspension was heated to reflux for 12 hours. The final polymer was filtered, washed, and dried.

EXAMPLE VI

Preparation of poly(vinyl acetate)/3% poly(N,N-diallylformamide)

To a 1 L resin kettle equipped with condenser, $N_2$-inlet, thermometer, thermowatch, mechanical stirrer, and heating mantle were added vinyl acetate (129.3 g), N,N-diallylformamide (5.82 g), methanol (73.2 g), tartaric acid (0.05 g) and Trigonox (0.11 g). The resulting solution was purged with $N_2$ for 1 hour, and then heated to 60° C. While maintaining the reaction temperature at 60° C., 0.66 g Trigonox (in 30 g MeOH, 0.05 g tartaric acid) was added into the reaction mixture over 6 hours. After an additional 18 hours, the resulting polymer solution was cooled to room temperature and was directly usable for the subsequent hydrolysis.

Hydrolysis to PVOH/3% PNDF

PVAc/3% PNDF polymer paste as prepared above was diluted with methanol to give a 10% solution. Unreacted vinyl acetate monomer in the polymer paste was then distilled off. The resulting solution was heated to 65° C., and KOH (0.02 eq. on VAc) in 10 g of methanol was then added into the polymer solution over 1 hour. The polymer precipitated as a white powder near the end of catalyst addition. After stirring for one more hour at 65° C., the polymer slurry was cooled and filtered.

Hydrolysis to PVOH/3% PDAm

The wet polymer powder was washed with methanol twice and then transferred to a 3-neck round bottomed flask equipped with condenser, $N_2$-inlet, thermometer, thermowatch, mechanical stirrer, and heating mantle. Methanol (160 g) and aqueous hydrochloric acid (3 eq. on DAF) were added. The resulting polymer suspension was heated to reflux for 12 hours. The final polymer was filtered, washed, and dried (yield = 88%).

Molecular weight distributions of the cationic polymers of Example III (PVOH/6% PDAm) and Example VI (PVOH/3% PDAm) are given in Table 1.

TABLE 1

| Polymer | Mw | Mn | Mw/Mn | I.V.* |
|---|---|---|---|---|
| PVOH/6% PDAm | 10,700 | 4,020 | 2.7 | 0.26 |
| PVOH/3% PDAm | 21,900 | 2,890 | 7.6 | 0.33 |

Absolute values from SEC/DV
Conditions:
Mobile Phase - 0.1% TFA/0.10M sodium nitrate
Temperature - 35° C
Columns - CATSEC (Polyvinylamine coated), Synchrom, Inc.
Standards - Poly(2-vinylpyridine)
*I.V. is intrinsic viscosity.

EXAMPLE VII

Preparation of poly(vinyl acetate)/6% poly(N-allylformamide)

To a 1 L resin kettle equipped with condenser, $N_2$-inlet, thermometer, thermowatch, mechanical stirrer, and heating mantle were added vinyl acetate (125.5 g), N-allylformamide (11.65 g), methanol (72.3 g), tartaric acid (0.05 g) and Trigonox (0.11 g). The resulting solution was purged with $N_2$ for 1 hour, and then heated to 60° C. While maintaining the reaction temperature at 60° C., 0.66 g Trigonox (in 30 g MeOH, 0.05 g tartaric acid) was added into the reaction mixture over 6 hours. After an additional 18 hours, the resulting polymer solution was cooled to room temperature and was directly usable for the subsequent hydrolysis (VAc conversion = 37%).

Hydrolysis to PVOH/6% PNAF

PVAc/6% PNAF polymer paste prepared above was diluted with methanol to give a 10% solution. Unreacted vinyl acetate monomer in the polymer paste was then distilled off. The resulting solution was heated to 65° C., and KOH (0.02 eq. on VAc) in 10 g of methanol was then added into the polymer solution over 1 hour. The polymer precipitated as a white powder near the end of catalyst addition. After stirring for one more hour at 65° C., the polymer slurry was cooled and filtered.

Hydrolysis to PVOH/6% PDAm

The wet polymer powder was washed with methanol twice and then transferred to a 3-neck round bottomed flask equipped with condenser, $N_2$-inlet, thermometer, thermowatch, mechanical stirrer, and heating mantle. Methanol (160 g) and aqueous hydrochloric acid (3 eq. on AF) were added. The resulting polymer suspension was heated to reflux for 12 hours. The final polymer was filtered, washed, and dried.

Other aspects and embodiments of our invention will be apparent to those skilled in the art from the foregoing disclosure without departing from the spirit or scope of the invention.

We claim:

1. A process for making a poly(vinyl alcohol) copolymer containing copolymerized units of allylamine or diallylamine or both which comprises suspending in methanol particles of a poly(vinyl alcohol) copolymer containing copolymerized units of N-allylamide or N,N-diallylamide or both and hydrolyzing said amide-containing copolymer particles under acidic or basic conditions to form particles of said amine-containing copolymer.

2. The process of claim 1 wherein the hydrolysis is performed using basic conditions to yield salt free particles of said amine-containing copolymer.

3. The process of claim 1 wherein the hydrolysis is performed under acidic conditions to yield particles of the corresponding acid salt of said amine-containing copolymer.

4. The process of claim 1 wherein said poly(vinyl alcohol) amide-containing copolymer can be represented by the following structural formula having randomly copolymerized monomer units in the indicated molar proportions:

wherein
R is H, alkyl containing 1 to 11 carbons, phenyl, or trifluoromethyl;
$R^1$ is H, alkyl containing 1 to 4 carbons, or 2-hydroxyalkyl containing 1 to 4 carbons,
each $R^2$ is H, methyl or trifluoromethyl;
m, n, x and y are integers which added together make a sum;
m is 0 to 15 percent of said sum;
n is 50 to 99 percent of said sum; and
x or y can be zero but the total of x+y is 1 to 50 percent of said sum.

5. The process of claim 4 wherein the hydrolysis is performed under basic conditions and m is 0 to 2 percent of said sum.

6. The process of claim 4 wherein x is zero, and R is methyl and $R^2$ is hydrogen.

7. The process of claim 4 wherein y is zero, R is methyl, and $R^1$ and $R^2$ are hydrogen.

8. A process for making a poly(vinyl alcohol) copolymer containing copolymerized units of allylamine and/or diallylamine which comprises:

(a) copolymerizing vinyl acetate with either or both of N-allylformamide and N,N-diallylformamide to form a poly(vinyl acetate) copolymer containing copolymerized units of N-allylformamide or N,N-diallylformamide or both in an alcohol solution, (b) hydrolyzing the acetate functionality of said poly(vinyl acetate) copolymer in a methanolic medium to form a poly(vinyl alcohol) copolymer containing copolymerized units of N-allylformamide or N,N-diallylformamide or both as a particulate gel swollen with methanol, and (c) hydrolyzing said particulate gel as a slurry in methanol with 0 to 20 percent water to form said amine-containing copolymer of poly(vinyl alcohol).

9. The process of claim 8 wherein said alcohol is methanol, said solution of step (a) is diluted with methanol and unreacted vinyl acetate is distilled therefrom prior to step (b), said particulate gel from step (b) is filtered and washed with methanol prior to step (c), and the product of step (c) is separated, washed with methanol and dried.

10. The process of claim 8 wherein said hydrolyzing of step (b) is under basic conditions and said hydrolyzing of step (c) is under acidic conditions.

11. A copolymer of vinyl alcohol containing amine functionality and having the structural formula of randomly interpolymerized monomer units in the indicated molar proportions:

wherein
R is H, alkyl containing 1 to 11 carbons, phenyl, or trifluoromethyl;

$R^1$ is H, alkyl containing 1 to 4 carbons, or 2-hydroxyalkyl containing 1 to 4 carbons;

each $R^2$ is H, methyl or trifluoromethyl;

m, n, x, y, a and b are integers which added together make a sum;

m is 0 to 15 percent of said sum;

n is 50 to 99 percent of said sum;

x plus y are 0 to 30 percent of said sum; and a or b can be zero but the total of a and b is 1 to 50 percent of said sum, except that b is greater than zero when a is less than 5 percent of said sum.

12. The copolymer of claim 11 wherein R is methyl, $R^1$ and $R^2$ are hydrogen, m is 0 to 2 percent of said sum, n is 80 to 97 percent of said sum, x plus y are 0 to 4 percent of said sum, and a plus b are 3 to 20 percent of said sum.

13. The copolymer of claim 12 wherein y and b are zero.

14. The copolymer of claim 12 wherein x and a are zero.

15. The copolymer of claim 13 wherein x is 0.5 to 4 percent of said sum.

16. The copolymer of claim 14 wherein y is 0.5 to 4 percent of said sum.

* * * * *